United States Patent Office 2,970,842
Patented Feb. 7, 1961

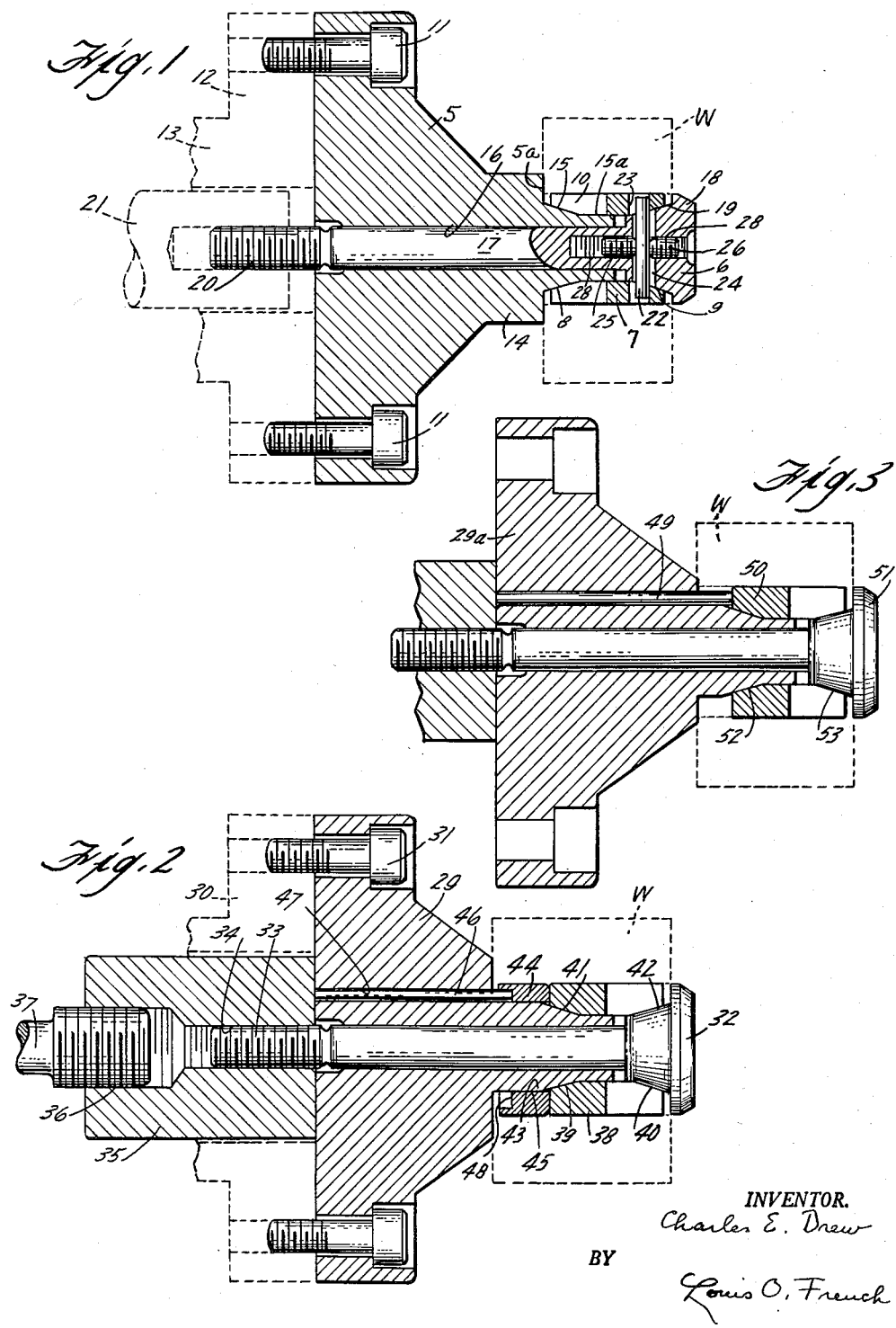

2,970,842

EXPANDING MANDREL CHUCK

Charles E. Drew, 4400 Durand Road, Racine, Wis.

Filed Jan. 22, 1958, Ser. No. 710,493

2 Claims. (Cl. 279—2)

The invention relates to expanding type mandrel chucks.

The object of this invention is to provide a stop means for the mandrel sleeve to hold the sleeve against any expanding movement against the chuck head that might be occasioned by the part to be chucked as it is placed on the mandrel due to undue pressure from the cocking or other misalinement of this part and especially where the parts to be chucked are automatically loaded on the mandrel. Any expanding movement of the mandrel induced by the work is objectionable as it may prevent the positioning of the part completely over the mandrel and its abutment at one end with the stop shoulder on the chuck head.

The invention further consists in the several features hereinafter set forth and more particularly defined by claims at the conclusion hereof.

In the drawings:

Fig. 1 is a vertical sectional view of a mandrel chuck embodying the invention;

Fig. 2 is a view similar to Fig. 1 showing certain modification;

Fig. 3 is a detailed sectional view showing modifications of Fig. 2.

Referring to Fig. 1, the chuck includes cooperative members 5 and 6 adapted to expand and hold between them an expanding sleeve type mandrel 7 of known form having conically faced ends 8 and 9 and slots 10 (only one set being shown) extending inwardly from said ends. Mandrel 7, on being expanded, engages a bore in the work piece W to hold it in position on the chuck while one end of said piece engages a shoulder 5a on the member 5. The invention herein is also applicable to those known forms of exptnding sleeve mandrel having a single conically faced end to engage the member 5, the other end being flat to engage a flat face of the member 6.

For operating on the work piece, the chuck may be rotated by connection with some kind of rotating drive member, such as a face plate connected with the drive spindle of a lathe, milling machine, gear shaper or other machine tool. As illustrative of one form of driving connection, I show the base of the member 5 provided with equidistantly circumferentially spaced holes (two being shown) to receive cap screws 11 which clamp said member to the flanged portion 12 of a face plate 13. In some instances the chucks are not mounted on machine tools but are used as non-rotatable fixtures.

The chuck member 5 has a forwardly projecting spindle portion 14 provided with a centrally disposed conical end portion 15, which may have a plain cylindrical extension 15a, said portions 15 and 15a adapted to be received within the mandrel 7 as indicated in Fig. 1 and has a centrally disposed longitudinally extending bore 16 adapted to slidably receive the shank 17 of the member 6.

The member 6 is the mandrel expander drawpin and has an exteriorly disposed head 18 provided with a conical surface 19 to engage the conical end 9 of the mandrel and its shank 17 has a threaded end 20 adjustably mounted in the threaded bore of a draw bar 21 which may be either manually or power operated in known manner.

At the time the work piece W is applied to the mandrel 7, this mandrel is loose enough so that if the work piece is cocked or otherwise misalined with the mandrel, it might push the mandrel to the left as viewed in Fig. 1 causing its left hand end to expand, and this expanding action will prevent the work piece being moved completely over the mandrel to bring it up against the stop shoulder 5a. In order to prevent this occurring I have provided a stop means that holds the mandrel against such an expanding movement during the loading of a work piece thereon.

As shown in Fig. 1, this stop means includes a pin 22 that extends through diametrically disposed slots 23 in the mandrel 7 and an alined diametrically disposed bore 24 in the head of the drawpin 6 with means for holding this pin in the desired position of adjustment comprising set screws 25 and 26 mounted in portions of a centrally disposed threaded hole 28 in the drawpin, which pin is then held in the position shown in any suitable manner. By proper adjustment of the set screw 25, the pin 22 is positioned so that it will engage the outer ends of the slots 23 and hold the right hand taper 9 of the mandrel 7 securely against the conical surface 19 of the drawpin. Thereafter, the screw 26 is turned in to engage the pin 22 which is now clamped between the screws 25 and 26. Now, with the drawpin being held to the right, when the work piece W is placed over the mandrel 7, it will not be able to shift this mandrel so as to force its left hand end up the conical end portion 15 of the chuck member 5. However, when the drawbar 21 and the drawpin or member 6 are drawn toward the left, the pin 22 will permit the normal operation of the expansion sleeve or mandrel 7 to take place and lock the work W in its proper position.

In the form shown in Fig. 2, the chuck member 29 is similar to the member 5 and similarly secured to a rotary face plate 30 by screws 31.

The drawpin 32 is similar to the drawpin 6 and its threaded end 33 is mounted in the centrally disposed threaded bore 34 of a drawbar connector 35 which in turn has a threaded connection at 36 with a drawbar 37.

The expanding type mandrel 38 has conically tapered ends 39 and 40 adapted to respectively engage the conically tapered surfaces 41 and 42 formed respectively on the outer end portion 43 of the member 29 and the head of the drawpin 32.

In this case, to hold the mandrel 38 against movement to the right during loading of the work thereon, a ring member 44 is mounted on a cylindrical portion 45 of the chuck adjacent the surface 41 and is restrained against movement toward the left by a stop pin 46 mounted in a bore 47 of the chuck member 29 and engaging at its front end in a recess 48 in the adjacent side of the ring member 44.

In some instances as shown in Fig. 3, the ring member 44 may be dispensed with and a stop pin 49, similar to pin 47, mounted in the chuck member 29a, similar to the member 29, is used alone to engage and limit the movement of the mandrel 50 to the left while loading work thereon, this mandrel being thereafter moved to work engaging position by the drawing in of the drawpin 51 causing the expansion of said mandrel by the action of the tapered surfaces 52 and 53 on the chuck and drawpin on the corresponding tapered surfaces of the mandrel. A plurality of circumferentially spaced equal length stop pins 49 may be used, if desired.

I desire it to be understood that this invention is not

What I claim as my invention is:

1. In a chuck comprising a chuck member having an apertured tapered spindle, a lengthwise adjustable drawpin having a tapered end and a shank having a portion slidably movable and guided in an aperture in said spindle, an expanding chucking mandrel inwardly tapered at opposite ends thereof and engaged at said respective tapered ends by said tapered spindle and the tapered end of said drawpin, said mandrel including a slotted stop portion, a stop pin mounted in the head of said drawpin and engageable with the slot of said stop portion for rigidly holding said mandrel, while loading the same with a work piece, against movement on said tapered spindle in an endwise direction tending to expand the same.

2. The chuck as defined in claim 1, wherein the stop pin is adjustably mounted between a pair of clamping set screws in the head of the drawpin for engagement with the said slotted stop portion.

References Cited in the file of this patent

UNITED STATES PATENTS

| | | |
|---|---|---|
| 2,679,399 | Van Dorn | May 25, 1954 |
| 2,789,825 | Drew | Apr. 23, 1957 |
| 2,829,897 | Parker et al. | Apr. 8, 1957 |

FOREIGN PATENTS

| | | |
|---|---|---|
| 418,186 | Italy | Feb. 7, 1947 |
| 720,810 | Great Britain | Dec. 29, 1954 |
| 1,125,545 | France | July 16, 1956 |